J. A. OSTENDORF.
RESILIENT VEHICLE WHEEL.
APPLICATION FILED AUG. 21, 1920.

1,415,265.

Patented May 9, 1922.

Inventor
John A. Ostendorf
By his Attorney
N. T. Criswell

UNITED STATES PATENT OFFICE.

JOHN A. OSTENDORF, OF BALTIMORE, MARYLAND.

RESILIENT VEHICLE WHEEL.

1,415,265. Specification of Letters Patent. Patented May 9, 1922.

Application filed August 21, 1920. Serial No. 405,141.

*To all whom it may concern:*

Be it known that I, JOHN A. OSTENDORF, a citizen of the United States, and a resident of Baltimore, in the county of Baltimore and State of Maryland, have invented certain new and useful Improvements in a Resilient Vehicle Wheel, of which the following is a full, clear, and exact specification.

This invention relates more particularly to a class of appliances adapted to be used in conjunction with vehicles.

My invention has for its object primarily to provide a resilient wheel designed to be employed on vehicles, such as automobiles, autotrucks, bicycles and the like, whereby the shocks and jolts resulting from contact with surface irregularities of the highway on which the vehicle may be travelling will be absorbed, and which is of a type whereby the use of pneumatic tires may be dispensed with. The invention consists essentially of an inner circular member having a hub to allow the wheel to be rotatably mounted on the axle of a vehicle, and the peripheral edge part of this inner hub member is movably disposed in an opening provided on the inner periphery of an annular casing or concentric hollow felly of larger diameter than the inner member. Interiorly of the casing and at spaced intervals throughout its circumference are cushions which carry the inner hub member in resilient supension in the annular casing, while on the outer periphery of the casing may be an annular tread member or tire of solid rubber so that when the vehicle is travelling the impacts from contacts with obstacles will be received by the tread member, casing and cushions which in turn will yieldingly move upwardly and downwardly during their rotation without causing the inner hub member to likewise move thereby preventing the shocks of the impacts from being imparted to the vehicle.

A further object of the invention is to provide a resilient vehicle wheel of a simple, efficient and durable construction which may be made in various sizes and shapes.

With these and other objects in view, the invention will be hereinafter more fully described with reference to the accompanying drawing forming a part of this specification in which similar characters of reference indicate corresponding parts in all the views, and will then be pointed out in the claims at the end of the description.

In the drawing, Figure 1 is an elevation of one form of resilient vehicle wheel embodying my invention.

Figure 1:
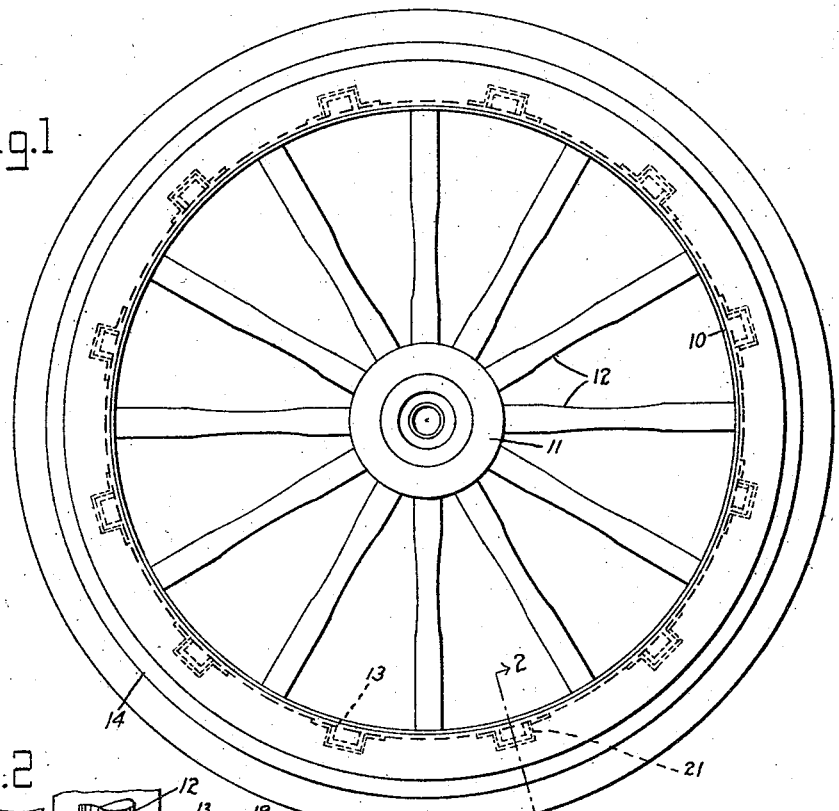
Figure 2:
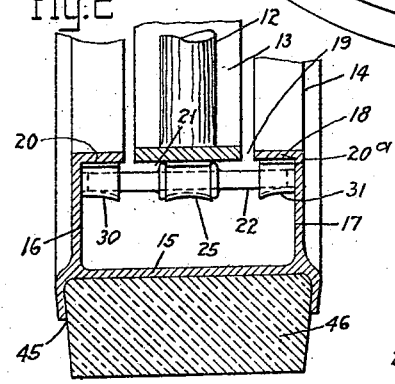
Fig. 2 is an enlarged fragmentary sectional view, partly in detail, taken on the line 2—2 of Fig 1.
Figure 3:
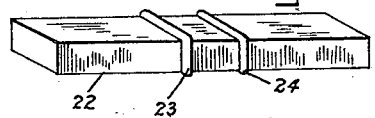
Fig. 3 is an enlarged perspective of one of the cushions or resilient strips used in the wheel.
Figure 4:
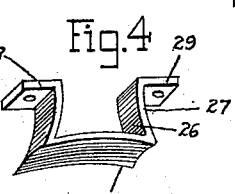
Fig. 4 is an enlarged perspective of one of the straps used in conjunction with each of the cushions of the wheel.
Figure 5:
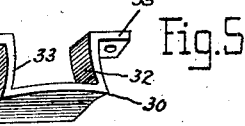
Fig. 5 is an enlarged perspective of one of the pairs of straps used also in conjunction with each of the resilient strips shown in Fig. 3.

The wheel has an inner circular member 10 which may be of any suitable diameter, and this member is composed of a hub 11 to allow the wheel to be rotatably mounted on the axle of a vehicle, such as the wheel of an automobile, auto truck, bicycle and the like. Projecting radially from the hub are a plurality of spaced spokes 12, preferably twelve in number, though instead of using spokes I may employ a disk, not shown, as is incident to many forms of wheels. Held on the outer ends of the spokes 12 is an annular rim or band, as 13.

The inner circular member 10 of the wheel is yieldingly suspended in an annular casing or hollow concentric felly, as 14, so that when the vehicle is travelling the shocks and jolts from contacts with surface irregularities in the highway will be absorbed by the casing. The casing 14 is of a diameter so that its outer periphery is considerably spaced from the rim 13 of the inner member 10, and this casing may be of any appropriate shape, though the form of casing illustrated is substantially rectangular, in cross section, to provide an outer peripheral wall 15, spaced side walls 16, 17 and an inner peripheral wall 18 which is centrally slotted, at 19, throughout its circumference to form an entrance leading into the interior of the casing. By slotting the inner peripheral wall 18 of the casing in this manner the wall is divided into two spaced opposed members 20 and 20ª.

The inner periphery 18 of the casing 14 is of a diameter corresponding approximately to the diameter of the rim 13 of the inner member 10 of the wheel, and the slot or entrance 19 of the casing is of a size so that the rim of the inner member movably fits in the entrance. The inner member 10 may thereby be moved inwardly and outwardly of the casing 14 crosswise with relation to the diameter of the casing. Associated with the casing 14 and with the inner member 10 are a number of cushions 21 serving to yieldingly support the inner member 10 of the wheel in suspension in the casing 14.

All of the cushions 21 may be of similar formation as well as being of any suitable type, though each cushion preferably consists of a strip 22 of pure rubber or rubber vulcanized to the required resiliency. Extending from spaced parts of the central portion of each of the resilient strips 22 may be flanges or ribs, as 23 and 24, to serve as stops. There may be twelve or a greater or less number of the strips 22, and all of the strips are arranged crosswise of the casing 14 at spaced intervals throughout its circumference at parts of the casing in proximity to the entrance 19 substantially midway between each pair of the spokes 12 of the inner member 10 so that the rim or band 13 of the inner member bears upon all of the strips. The part of each of the resilient strips 22 between its flanges 23 and 24 is yieldingly held to the annular rim 13 of the inner member 10 by straps or sleeves, as 25, all of which may be similarly formed. Each of the straps 25 has a substantially U-shaped body part 26, and these U-shaped parts of the straps are of sizes so that they closely hug the strips to prevent the strips from tendency to slidably shift laterally, while the flanges or stops 23 and 24 serve to prevent lateral slidable movements of the rim 13 of the inner member on the strips. Both of the end edges of the U-shaped part or body 26 of each of the straps may be outwardly curved or flared, as at 27, to obviate rubbing or chafing of the strips by friction with the straps 25 during the cushioning movements of the strips. Projecting laterally in opposite directions from the arms of the U-shaped parts 26 of each of the straps are lugs or wings, as 28 and 29, which lie upon the annular rim 13 of the inner member 10, and these lugs of each strap are bolted or otherwise fastened, to the rim of the inner member 10. The ends of each of the strips 22 are snugly held yieldingly in a pair of straps or sleeves 30 and 31. Each pair of the straps 30 and 31 are provided on the concentric casing 14 in spaced alined arrangement relative to the ends of each of the straps 25 of the rim 13 of the inner member 10. The straps 30 and 31 of each pair may be alike in formation, and each strap has an approximately U-shaped body or part 32 of a size which tightly engages the end of the strip 22 seated therein. The end edge of each strap 30 and 31 of each pair which is opposed to the associate strap 25 may be flared or curved outwardly, as at 33, to prevent the strip 22 mounted therein from rubbing or chafing under the resilient play of the strip. All of the pairs of straps 30 and 31 are arranged within the casing 14 so that their ends opposite to their flared ends abut against the side walls of the casing 14, while the free ends of the arms of their U-shaped parts 32 abut against the undersides of the members 20 and 20ª of the inner peripheral wall 18 of the casing 14. The pairs of straps 30 and 31 are held to the casing 14 by providing on the free ends of the arms of the U-shaped part of each strap lugs or wings 34 and 35 which extend in opposite directions rightangularly from the arms of the U-shaped part of the strip, and these lugs of each of the straps 30 and 31 are bolted or otherwise secured to the members 20 and 20ª of the inner peripheral wall 18 of the casing.

Figure 6:
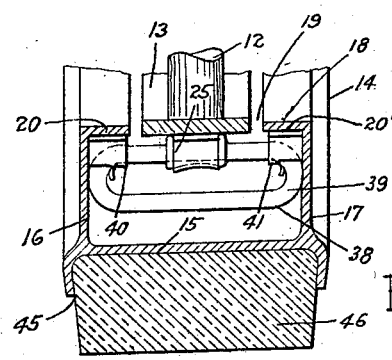
Fig. 6 is an enlarged fragmentary detail sectional view of a number of the parts of the wheel shown in Fig. 2 and which illustrates a different form of cushion adapted to be employed in the wheel.
Figure 7:
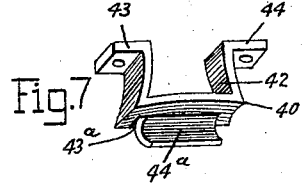
Fig. 7 is an enlarged perspective of one of the pairs of straps used in the form of the cushion shown in Fig. 6.

In Figs. 6 and 7 are shown forms of cushions 38 each of which is composed of a band or ring 39 of pure rubber or rubber vulcanized to the required resiliency instead of using the rubber strips 22. All of the ring cushions 39 are of sizes so that when arranged in an elliptic shape, as illustrated, their extreme lengths correspond to the width of the interior of the annular casing 14, and these resilient rings or cushions 39 are disposed, like the strip cushions 22, crosswise of the interior of the casing 14 at spaced intervals adjacent to the rim 13 of the inner member 10 of the wheel as well as being adjacent to members 20 and 20ª of the inner peripheral wall 18 of the casing. Part of each of the resilient rings 39 is disposed through one of the straps 25 of the rim 13 of the inner member 10, and the elliptic resilient rings are disposed through pairs of straps or sleeves 40 and 41, Figs. 6 and 7. Each strap of each pair has a substantially U-shaped body or part 42 with lugs or wings 43 and 44 extending in opposite directions rightangularly from the free ends of the arms of the strap. Each pair of the straps 40 and 41 are disposed in straddle arrangement over each of the resilient rings 39 in opposed relation to their associate strap 25 of the inner member 10, and each pair of these straps are held to the members 20 and 20ª of the peripheral wall 18 interiorly of the casing 14 by bolting the lugs to the members 20 and 20ª. The bridging or cross member of the U-shaped body part 42 of each strap of each of the pairs of straps 40 and 41 has its edge which is adjacent to the adjoining side wall of the casing 14 cut-out, as at 43ª, and extending downwardly from one of the edges of this cut-out may be a curved tongue or extension, as 44ª. Each of the elliptic resilient rings or cushions 39 are arranged through the cut-outs 43 of each pair of the straps 40 and 41 and each resilient ring is also disposed over the curved tongues 44 of each pair of the straps so that tendency of the resilient rings to rub during their yielding movements on the pairs of straps will be prevented. The annular outer wall or periphery 15 of the casing 14 may be grooved, as at 45, and in this groove may be provided a solid tire or tread band 46 of rubber or other resilient material. In practice the weight of the vehicle imposed on the hub 11 and rim 13 of the inner member 10 of the wheel will be imparted to the cushions 22 or 38 whichever forms are employed, and the contact of the tread 46 of the wheel with the highway upon which the vehicle is travelling will cause the inner member of the wheel to be cushioned in a manner so that all shocks and jolts from impacts of the tread and casing 14 with irregularities or obstacles in the surface of the highway will be received and absorbed by the cushions, thus overcoming the necessity of employing pneumatic tires on vehicles, such as automobiles, autotrucks, bicycles and the like.

In the foregoing description, I have embodied the preferred form of my invention, but I do not wish to be understood as limiting myself thereto, as I am aware that modifications may be made therein without departing from the principle or sacrificing any of the advantages of this invention. Therefore, I reserve to myself the right to make such changes as fairly fall within the scope thereof.

Having thus described my invention, I claim as new and desire to secure by Letters Patent:—

1. A resilient vehicle wheel, comprising an inner circular member having a hub, an annular casing of larger diameter than the inner member and having in its inner periphery an opening in which the peripheral edge part of the inner member is movably disposed, elastic strip like elements disposed crosswise at spaced intervals throughout the circumference of the interior of the casing, said elements carrying the inner member in yielding suspension in the annular casing and spaced parts of each element being resiliently connected to the casing, and an annular tread member on the outer periphery of the casing.

2. The combination with a vehicle wheel, of an annular casing of larger diameter than the wheel and having in its inner periphery an opening in which the rim of the wheel is movably disposed, strip like resilient elements disposed crosswise at spaced intervals throughout the circumference of the interior of the casing, said elements carrying the wheel in yielding suspension in the annular casing, and straps on the casing and on the wheel, fastening spaced parts of each element to the casing and to the rim of the wheel the straps on the casing holding the strips yieldingly.

3. The combination, in a resilient vehicle wheel, of an annular casing movably surrounding the outer rim of the wheel, strip like resilient elements disposed crosswise at spaced intervals throughout the circumference of the interior of the casing, said elements supporting the wheel in yielding suspension in the annular casing, straps on the casing and on the rim of the wheel, fastening spaced parts of each element to the casing and to the wheel the straps on the casing holding the strips yieldingly, and an annular tread member on the outer periphery of the casing.

This specification signed and witnessed this 20 day of August, A. D. 1920.

JOHN A. OSTENDORF.

Witnesses:
J. FRANK,
J. FREDERICK CRYER.